(12) United States Patent
Kurian et al.

(10) Patent No.: US 10,404,675 B2
(45) Date of Patent: Sep. 3, 2019

(54) ELASTIC AUTHENTICATION SYSTEM

(71) Applicant: Bank of America Corporation, Charlotte, NC (US)

(72) Inventors: Manu Jacob Kurian, Dallas, TX (US); Sorin N. Cismas, Addison, TX (US); James P. Scopis, Newark, DE (US); Paul Grayson Roscoe, Treuddyn (GB); Thomas J. Durkin, Arlington Heights, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 190 days.

(21) Appl. No.: 15/678,912

(22) Filed: Aug. 16, 2017

(65) Prior Publication Data
US 2019/0058700 A1 Feb. 21, 2019

(51) Int. Cl.
H04L 29/06 (2006.01)

(52) U.S. Cl.
CPC ........ H04L 63/062 (2013.01); H04L 63/0823 (2013.01)

(58) Field of Classification Search
CPC .................. H04L 63/062; H04L 63/0823
See application file for complete search history.

(56) References Cited

U.S. PATENT DOCUMENTS

| | | |
|---|---|---|
| 5,097,115 A | 3/1992 | Ogasawara et al. |
| 5,721,781 A | 2/1998 | Deo et al. |
| 5,930,804 A | 7/1999 | Yu et al. |
| 6,076,164 A | 6/2000 | Tanaka et al. |
| 6,581,042 B2 | 6/2003 | Pare, Jr. et al. |
| 6,591,224 B1 | 7/2003 | Sullivan et al. |
| 6,697,947 B1 | 2/2004 | Matyas, Jr. et al. |
| 7,114,646 B2 | 10/2006 | Hillhouse |
| 7,427,019 B2 | 9/2008 | Haertel |
| 7,548,890 B2 | 6/2009 | Shakkarwar |
| 7,747,043 B2 | 6/2010 | Kamata et al. |
| 7,769,207 B2 | 8/2010 | Olivo, Jr. et al. |
| 7,784,684 B2 | 8/2010 | Labrou et al. |
| 7,805,614 B2 | 9/2010 | Aull et al. |

(Continued)

*Primary Examiner* — Darren B Schwartz
(74) *Attorney, Agent, or Firm* — Michael A. Springs; Moore & Van Allen PLLC; Nicholas C. Russell

(57) ABSTRACT

Embodiments of the invention are directed to a system, method, or computer program product for providing elastic authentication based on a continuum of elastic authentication credentials. In particular, the invention provides a secure platform for authorization of a user activity at least partly based on validation of the continuum of elastic authentication credentials comprising cumulative tiered elastic authentication tokens captured during an extended time period prior to initiation of a user activity. The invention provides a novel method for capturing multiple elastic authentication tokens, for example, arbitrarily during an extended time period preceding a user activity, and validating the cumulative elastic authentication tokens at a time during or after initiation of the user activity. Another aspect of the invention is directed to mitigating interception of authentication credentials by employing the elastic authentication tokens captured/received using multiple communication channels over various time periods preceding the user activity.

24 Claims, 6 Drawing Sheets

(56) References Cited

U.S. PATENT DOCUMENTS

| | | | |
|---|---|---|---|
| 7,865,937 B1 | 1/2011 | White et al. | |
| 8,006,291 B2 | 8/2011 | Headley et al. | |
| 8,384,515 B2 | 2/2013 | Rachlin | |
| 8,613,066 B1* | 12/2013 | Brezinski | G07C 9/00166 |
| | | | 713/168 |
| 8,661,520 B2 | 2/2014 | Shakkarwar | |
| 8,799,088 B2 | 8/2014 | Rothschild | |
| 9,286,528 B2 | 3/2016 | Harding | |
| 9,519,818 B2 | 12/2016 | Sahin et al. | |
| 2008/0077526 A1 | 3/2008 | Arumugam | |
| 2009/0031131 A1* | 1/2009 | Qiu | H04L 63/0442 |
| | | | 713/172 |
| 2011/0030047 A1* | 2/2011 | Gao | G06F 21/335 |
| | | | 726/9 |
| 2011/0119747 A1* | 5/2011 | Lambiase | G06F 21/335 |
| | | | 726/8 |
| 2013/0251216 A1 | 9/2013 | Smowton et al. | |
| 2014/0136419 A1 | 5/2014 | Kiyohara | |
| 2015/0227726 A1* | 8/2015 | Grigg | G06F 21/31 |
| | | | 726/7 |
| 2015/0242605 A1* | 8/2015 | Du | G06F 21/32 |
| | | | 726/7 |
| 2016/0180068 A1* | 6/2016 | Das | G06F 21/32 |
| | | | 726/7 |
| 2016/0337369 A1* | 11/2016 | Sanso | H04L 67/1097 |
| 2017/0134429 A1* | 5/2017 | Gustafsson | H04L 63/10 |
| 2017/0250812 A1* | 8/2017 | Schefenacker | H04L 9/321 |
| 2017/0374070 A1* | 12/2017 | Shah | H04L 63/20 |
| 2018/0375791 A1* | 12/2018 | Kaladgi | H04L 47/821 |

\* cited by examiner

ELASTIC AUTHENTICATION SYSTEM

FIELD OF THE INVENTION

The present invention is directed to, in general, providing secure authentication based on utilizing a continuum of elastic authentication tokens. Typically, the continuum of elastic authentication tokens are captured during an extended time period prior to initiation of a user activity. Furthermore, the present invention embraces a novel, proactive approach for safeguarding user information.

BACKGROUND

Over the last few years, there has been a significant increase in the number of electronic activities, due to widespread use of smartphone, tablet computers, laptop computers, transaction terminals, and electronic computing devices in general which are configured for accepting authentication credentials in electronic form. Typically, in conventional systems one or more authentication credentials are provided at the time of initiation of a user activity. These credentials are then transmitted to external systems for validation using a single communication channel. However, the credentials may be intercepted or accessed by unauthorized entities during transmission via the single communication channel which may then be utilized for future unauthorized user activities without the permission of the user. Moreover, because only a set of one or more credentials, which typically do not change for one user activity to another, are required to be validated for performing the user activity at a point in time, the veracity of the source/provider of credentials cannot be ascertained in conventional systems. Particularly, conventional systems are unable to provide secure authorization because the systems cannot effectively distinguish if the authentication credentials at the time of the user activity are provided by the user or by unauthorized entities.

The present invention provides a novel solution to the foregoing shortcomings of conventional systems and provides improvements to technology by employing continuum of elastic authentication tokens that are typically captured during an extended time period prior to and independent of initiation of a user activity. The previous discussion of the background to the invention is provided for illustrative purposes only and is not an acknowledgement or admission that any of the material referred to is or was part of the common general knowledge as at the priority date of the application.

SUMMARY

In one aspect, the present invention is directed to in general a system for assessing providing elastic authentication based on a continuum of elastic authentication credentials, a corresponding method, and computer program product. The system provides a secure platform for authorization based on validation of the continuum of elastic authentication credentials comprising cumulative tiered elastic authentication tokens captured during an extended time period prior to initiation of a user activity. The system typically includes at least one processing device operatively coupled to at least one memory device and at least one communication device connected to a distributed network. The system also typically includes a module stored in the at least one memory device comprising executable instructions that when executed cause the processing device and hence the system to perform one or more functions described below. In one embodiment, the system is configured to: generate a first elastic authentication credential capture signal structured to cause a first authentication credential capture device to initiate collection of one or more elastic authentication tokens; establish an operative communication link with the first authentication credential capture device associated with a user; transmit, via the operative communication link, the first elastic authentication credential capture signal to the first authentication credential capture device, wherein the first elastic authentication credential capture signal is structured to cause the first authentication credential capture device to initiate capture of a first elastic authentication token of the one or more elastic authentication credentials at a first time period; receive, from the first authentication credential capture device, the first elastic authentication token associated with the user, wherein the first elastic authentication token is captured during the first time period; receive, from a second authentication credential capture device, a second elastic authentication token associated with the user, wherein the second elastic authentication token is captured during a second time period succeeding the first time period; receive, a request to execute a user activity at a third time period succeeding the second time period, wherein the user activity requires authorization of the user; construct a continuum of elastic authentication credentials, wherein the continuum of elastic authentication credentials comprises the first elastic authentication token captured during the first time period, and the second elastic authentication token captured during the second time period, wherein the first time period and second time period precede the third time period of receiving a request to execute the user activity; authorize the user for the user activity at the third time period based on at least the successful validation of the continuum of elastic authentication credentials captured prior to receiving a request to execute the user activity at the third time period; and allow the user to execute the user activity based on at least the successful authorization of the user. The first and second elastic authentication tokens are captured prior to, independent of the user initiating the user activity or the user taking an action association with the user activity.

In another embodiment, and in combination with the previous embodiment, generating the first elastic authentication credential capture signal comprises: generating a credential parameter component associated with the first elastic authentication comprising credential parameters associated with each of the one or more elastic authentication tokens; wherein the credential parameters comprises a time period parameter and a credential type parameter; generating a source security metadata component configured to be utilized for ascertaining compromise of the elastic authentication credential capture signal; generating a credential key pair comprising a source credential key sub-component and a target credential key sub-component, wherein the source credential key sub-component and the target credential key sub-component are complementary and are structured to be utilized together to validate the one or more elastic authentication tokens; and constructing the first elastic authentication credential capture signal comprising the credential parameter component; wherein transmitting the first elastic authentication credential capture signal to the first authentication credential capture device comprises transmitting (i) the first elastic authentication credential capture signal and (ii) the target credential key sub-component.

In another embodiment, and in combination with any of the previous embodiments, the source credential key sub-component and the source security metadata component are not transmitted to the first authentication credential capture device.

In another embodiment, and in combination with any of the previous embodiments, receiving from the first elastic authentication token from first authentication credential capture device comprises: receiving the first elastic authentication token comprising: a captured credential component comprising authentication credential data associated with the user, captured during the first time period based on the credential parameters of the first elastic authentication credential capture signal; and a target security metadata component configured to be utilized for ascertaining compromise of the first elastic authentication token; and receiving the target credential key sub-component.

In another embodiment, and in combination with any of the previous embodiments, constructing the continuum of elastic authentication credentials comprises performing a first level of validation of the first elastic authentication token comprising: retrieving the source credential key sub-component associated with the generating the first elastic authentication credential capture signal of the first elastic authentication token; and identifying a successful first level of validation based on determining that the source credential key sub-component complements the target credential key sub-component received from the first authentication credential capture device.

In another embodiment, and in combination with any of the previous embodiments, constructing the continuum of elastic authentication credentials comprises, in response to the successful first level of validation, performing a second level of validation of the first elastic authentication token comprising: retrieving the source security metadata component associated with generating the first elastic authentication credential capture signal of the first elastic authentication token; and identifying a successful second level of validation based on determining that the source security metadata component matches the target security metadata component received from the first authentication credential capture device.

In another embodiment, and in combination with any of the previous embodiments, authorizing the user for the user activity at the third time period, comprises performing a third level of validation of the first elastic authentication token comprising: validating the captured credential component comprising authentication credential data associated with the user, captured during the first time period.

In another embodiment, and in combination with any of the previous embodiments, constructing the continuum of elastic authentication credentials comprises, performing lateral validation of the first elastic authentication token and the second elastic authentication token comprising: identifying a successful lateral of validation of the first elastic authentication token and the second elastic authentication token based on determining that (i) the source credential key sub-component of the first elastic authentication token matches a corresponding source credential key sub-component of the second elastic authentication token, and/or (ii) the target credential key sub-component of the first elastic authentication token matches a corresponding target credential key sub-component of the second elastic authentication token.

In another embodiment, and in combination with any of the previous embodiments, generating the first elastic authentication credential capture signal comprises encoding the elastic authentication credential capture signal, wherein the source security metadata component comprises a cyclic redundancy check (CRC) code and/or a checksum associated with the elastic authentication credential capture signal.

In another embodiment, and in combination with any of the previous embodiments, generating the first elastic authentication credential capture signal comprises encoding the elastic authentication credential capture signal, wherein the first elastic authentication credential capture signal comprises: a trigger code that is configured to cause the first authentication credential capture device to arbitrarily modify the credential type parameters and/or the time period parameters for collection of the one or more elastic authentication tokens at predetermined intervals of time.

In another embodiment, and in combination with any of the previous embodiments, transmitting via the operative communication link, the first elastic authentication credential capture signal further comprises: transmitting, via a first operative communication channel, a first portion of the first elastic authentication credential capture signal to the first authentication credential capture device; and transmitting, via a second operative communication channel, a second portion of the first elastic authentication credential capture signal to the first authentication credential capture device.

In another embodiment, and in combination with any of the previous embodiments, the system is further configured to: generate a second elastic authentication credential capture signal configured to cause the second authentication credential capture device to initiate collection of the second elastic authentication token at the second time period; transmit, the second elastic authentication credentials capture signal to the second authentication credential capture device, wherein the first elastic authentication credential capture signal is structured to cause the second authentication credential capture device to initiate capture of the second elastic authentication token at the second time period; and receive, from the second authentication credential capture device, the second elastic authentication token associated with the user, wherein the second elastic authentication token is captured by the second authentication credential capture device during the second time period succeeding the first time period.

In another embodiment, and in combination with any of the previous embodiments, the first authentication credential capture device is same as the second authentication credential capture device, wherein the first elastic authentication credential capture signal is configured to cause the first authentication credential capture device to initiate capture of the second elastic authentication token of the one or more elastic authentication credentials at the second time period succeeding the first time period.

In another embodiment, and in combination with any of the previous embodiments, the first elastic authentication credential capture signal is configured to capture the first elastic authentication token at the first time period such that (i) the first time period occurs at an unscheduled arbitrary time period, or (ii) the first time period is a predetermined time period.

In another embodiment, and in combination with any of the previous embodiments, the second elastic authentication token is captured during a second time period (i) occurring after a time interval of an arbitrary length following the first time period, or (ii) occurring after a time interval of a predetermined length following the first time period.

In another embodiment, and in combination with any of the previous embodiments, the system is further configured to: the first elastic authentication token captured during the first time period is received from the first authentication credential capture device after receiving a request to execute the user activity at the third time period, wherein receiving the first authentication token comprises: transmitting a token request signal, via the operative communication link, to the first authentication credential capture device in response to receiving the request to execute the user activity, wherein the token request signal is configured to cause the first authentication credential capture device to transmit the first elastic authentication token captured during the first time period.

In another embodiment, and in combination with any of the previous embodiments, the system is further configured to: construct an auxiliary continuum of elastic authentication credentials associated with an auxiliary user, wherein the continuum of elastic authentication credentials comprises one or more elastic authentication tokens associated with the auxiliary user; and authorize the user for the user activity based on at least the successful validation of (i) the continuum of elastic authentication credentials associated with the user and (ii) the auxiliary continuum of elastic authentication credentials associated with the auxiliary user.

In another embodiment, and in combination with any of the previous embodiments, authorizing the user for the user activity at the third time period comprises: determining whether the continuum of elastic authentication credentials matches a required quorum of elastic authentication tokens for the user activity; based on determining that the continuum of elastic authentication credentials does not match the required quorum of elastic authentication tokens for the user activity, identifying a third elastic authentication token associated with the user captured prior to the third time period of receiving a request to execute the user activity such that the third elastic authentication token together with the continuum of elastic authentication credentials matches the required quorum of elastic authentication tokens for the user activity; and augmenting the continuum of elastic authentication credentials with the third elastic authentication token.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
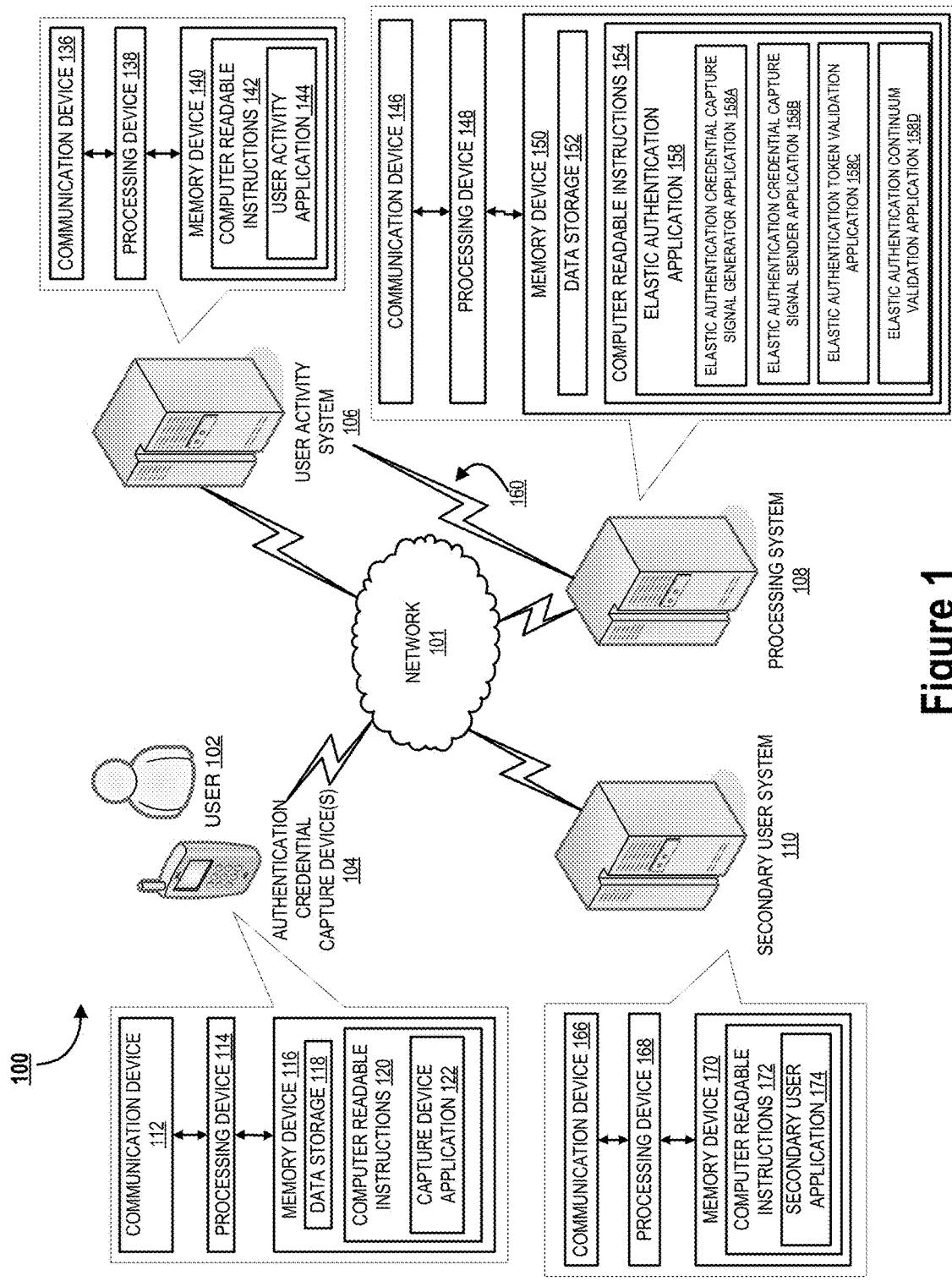
Figure 2:
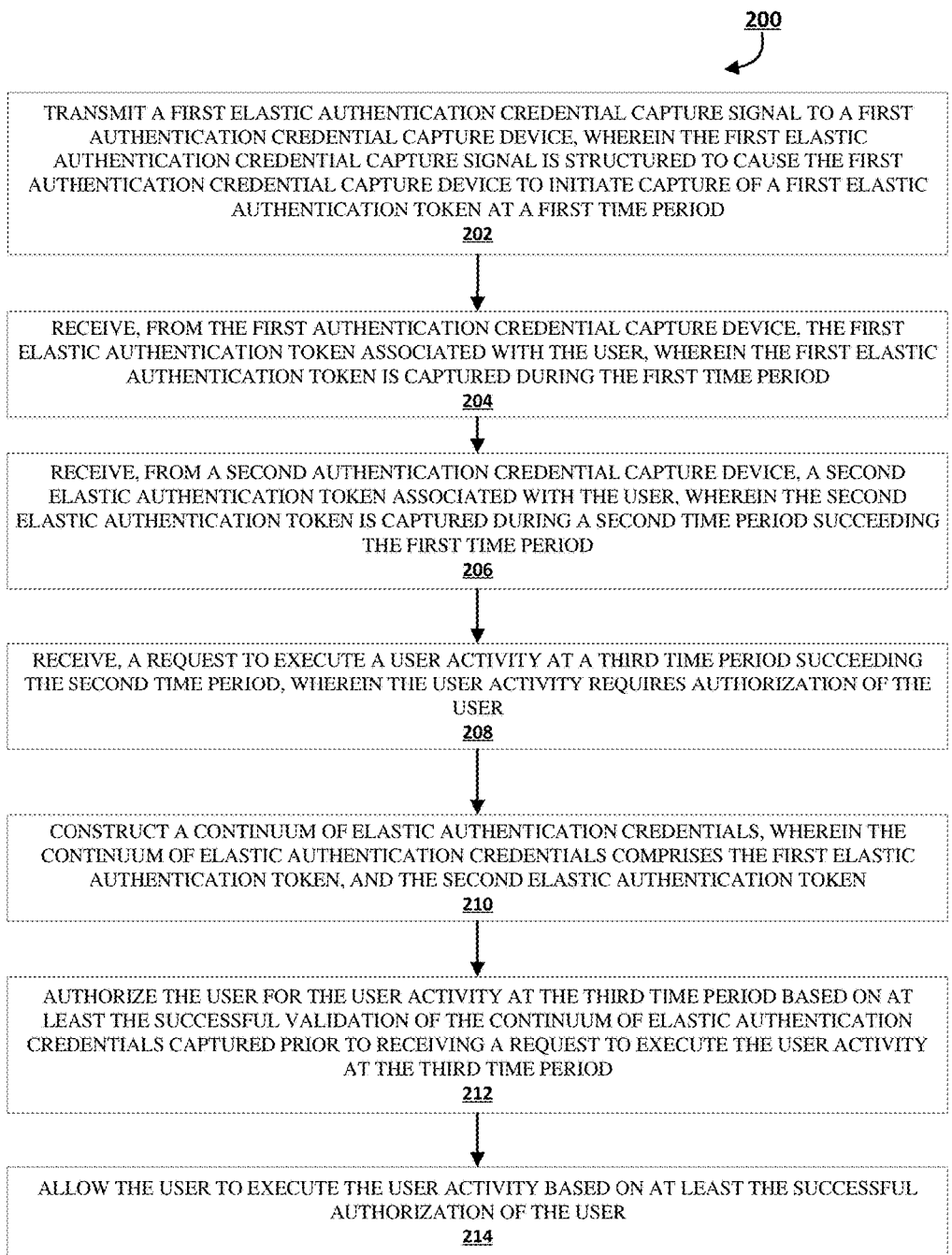
Figure 3A:
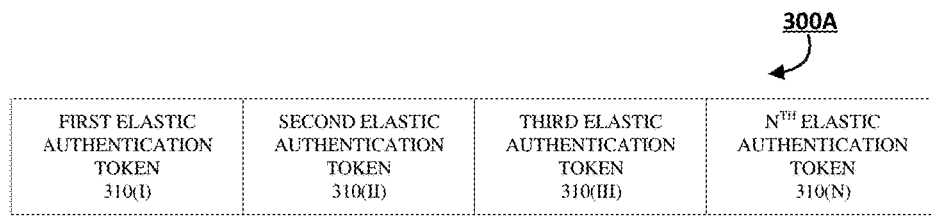
Figure 3B:
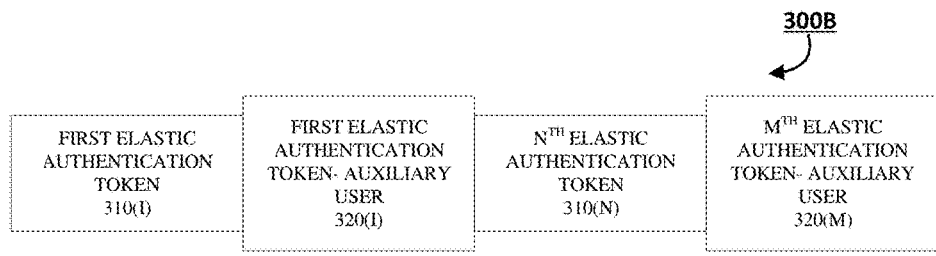
Figure 4:
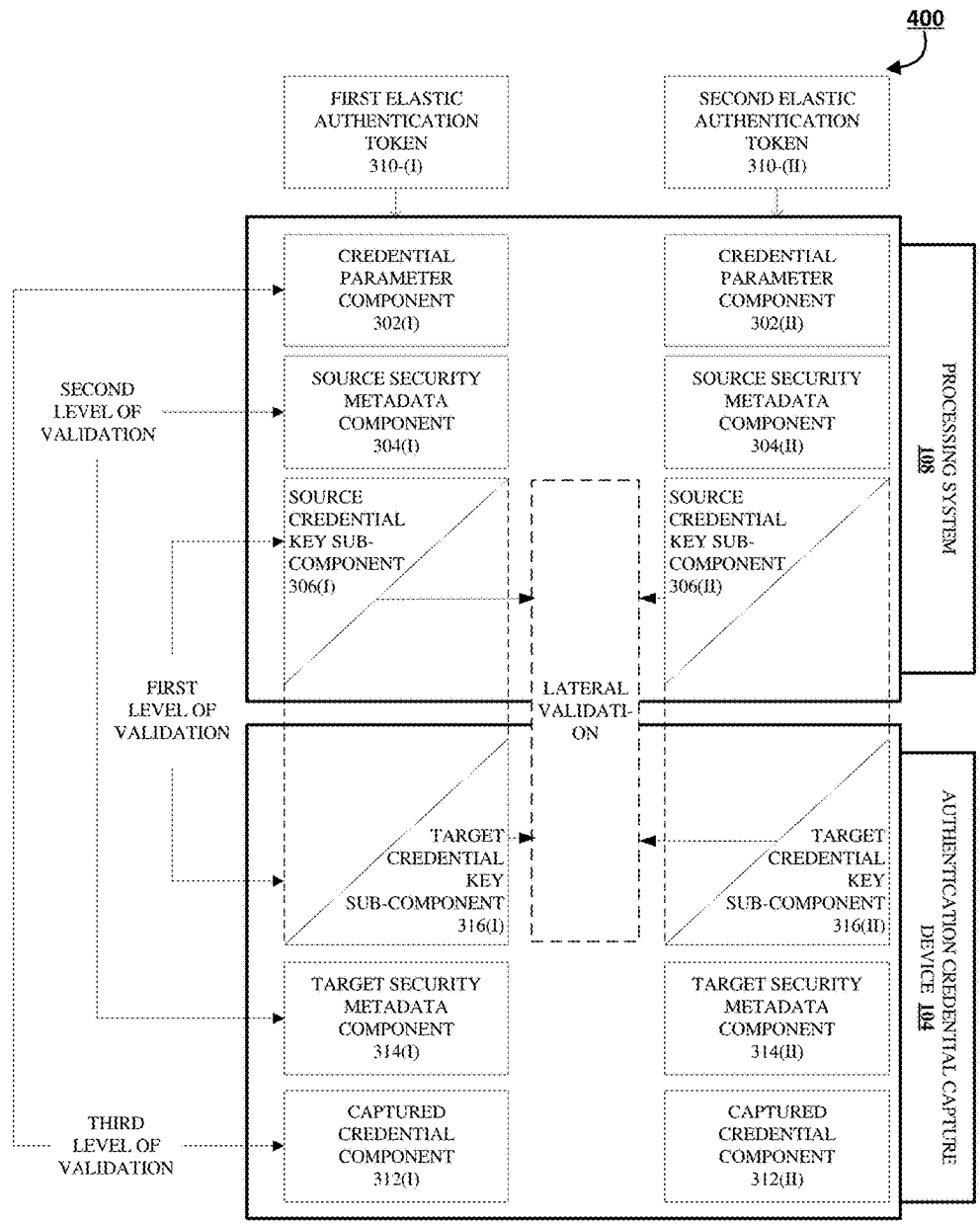
Figure 5A:
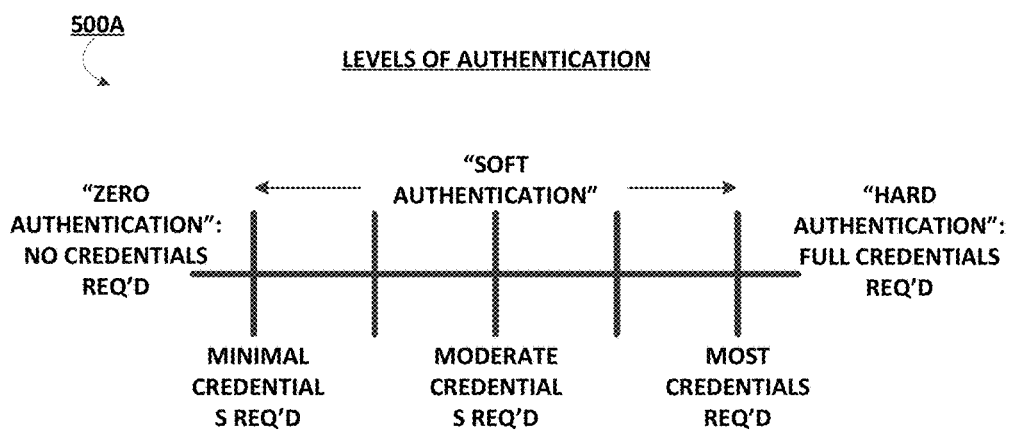
Figure 5B:
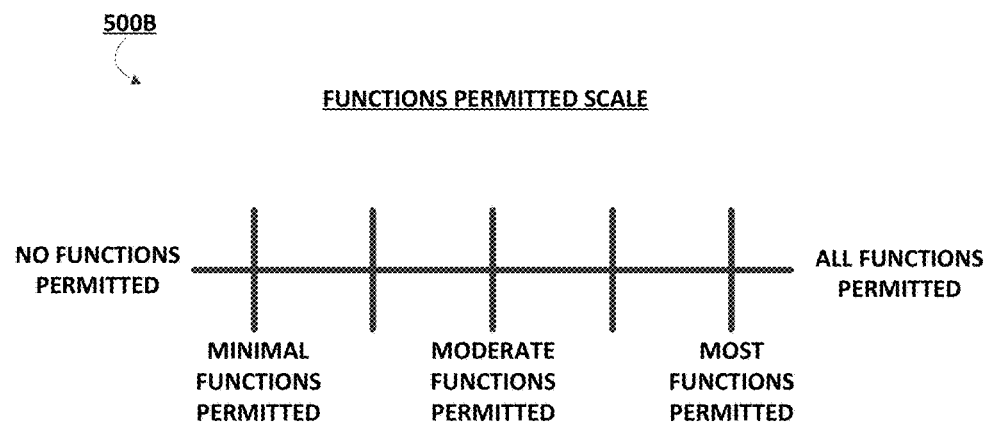
Figure 5C:
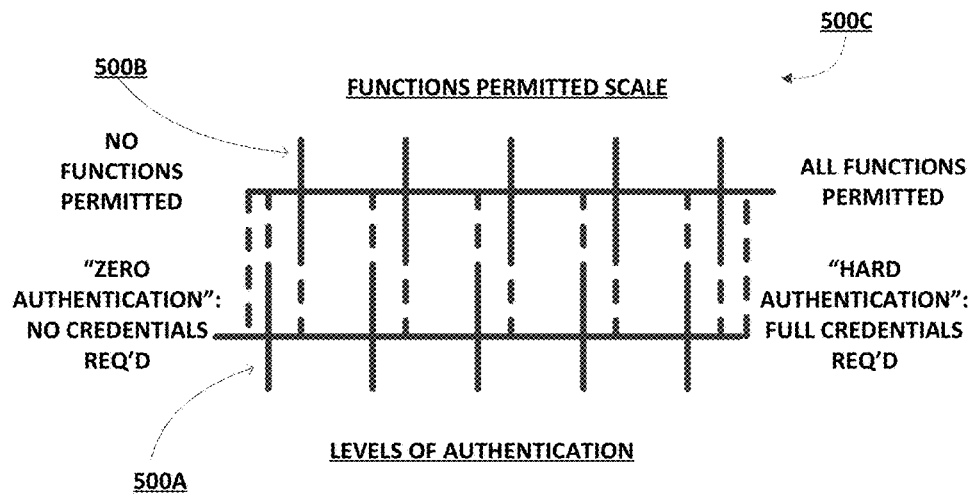
Figure 5D:
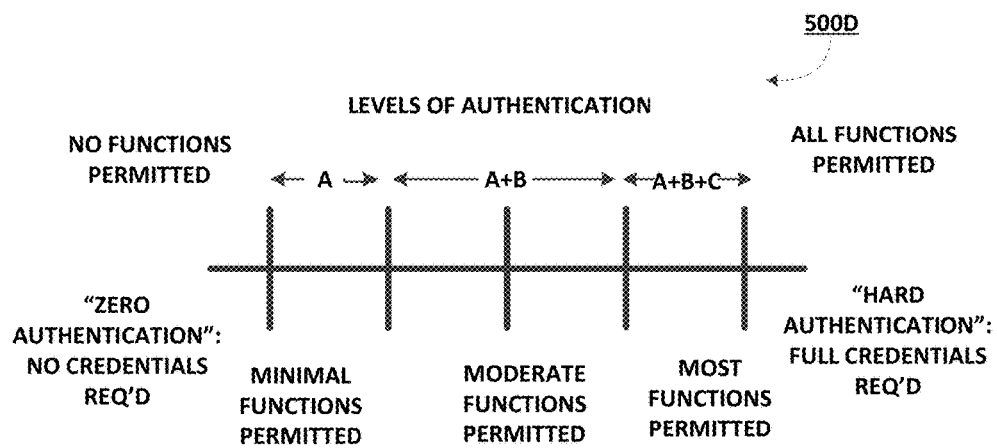

Having thus described embodiments of the invention in general terms, reference will now be made the accompanying drawings, wherein:

FIG. 1 schematically depicts an authentication system and environment 100, in accordance with an aspect of the present invention;

FIG. 2 schematically depicts a high level process flow 200 for providing elastic authentication in accordance with some embodiments of the invention;

FIG. 3A schematically depicts an illustrative representation of the continuum of elastic authentication credentials 300A, in accordance with some embodiments of the invention;

FIG. 3B schematically depicts an illustrative representation of a hybrid continuum of elastic authentication credentials 300B, in accordance with some embodiments of the invention;

FIG. 4 illustrates a schematic depiction 400 of the structure and process flow for constructing and validating one or more elastic authentication tokens, in accordance with some embodiments of the invention;

FIG. 5A presents an illustration of the authentication scale in accordance to one embodiment of the invention;

FIG. 5B presents an illustration of the functions permitted scale in accordance to one embodiment of the invention;

FIG. 5C presents an illustration of the coupling of the functions permitted scale and the levels of authentication scale in accordance to one embodiment of the invention; and FIG. 5D presents an illustration of the relationship between the functions permitted and the authentication types in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

With advancements in technology infrastructures and wireless communication implementation, electronic devices such as transaction terminals such as point of sale terminals, portable multi-function devices, such as laptop computers, tablet computers, mobile phones, smart phones, wearable devices and the like are common. Typically, individuals may also have a mobile user device with them. These electronic devices may enable performance of user activities (e.g., financial activates, purchases, resource transfers, accessing resource data stored at other systems and databases and the like) based on requisite authorization. These electronic devices may also be configured to allow the user to perform the one or more user activities, transactions or resource transfers through an application, accept authentication credentials from the user, transmit authentication credentials for validation at external systems, etc.

Typically, execution of the user activity requires validation of one or more authentication credentials, based on the type of activity. In this regard, the user activity may be associated one or more authentication credentials. For example, a user activity comprising performing a resource transfer between accounts (e.g., financial accounts) may be required authenticate using a username and password. As another example, another user activity comprising initiating a purchase at transaction terminal (e.g., a point of sale terminal) may require authentication credentials in the form of payment vehicle identifiers (e.g., provided by the user by swiping a credit/debit card, by using digital wallet tokens) and their associated personal identification numbers (PIN) (e.g., provided by the user using an input device of the terminal). These credentials provided by the user are typically transmitted to an authentication system (e.g., a financial institution system) for validation using a single communication channel. However, the credentials may be intercepted or accessed by unauthorized entities during transmission via the single communication channel which may then be utilized for future unauthorized user activities without the permission of the user. For example, the credit card identifiers and the associated PIN may be accessed/replicated by an unauthorized entity during the short invalid of transmission using the single communication channel between the transaction terminal and the financial institution system validating the credentials. Hence, the security of the credentials may not be maintained at all times. Moreover, these set of one or more credentials, e.g., the credit card identifiers and the associated PIN, typically do not change from one user activity to the next. Hence, the credit card identifiers and the associated PIN replicated by unauthorized entities may be utilized to perform future activities without the permission of the user, thereby defeating the purpose of authentication for user activities. Also, conventional systems typically cannot effectively distinguish if the credentials are provided by the user or if the same credentials are provided by the unauthorized entity.

There exists a need for a robust authentication system that ameliorates the foregoing deficiencies, effectively safeguards user information, and provides effective authentication. In this regard, the present invention provides validation of elastic authentication tokens that are typically captured during an extended time period prior to initiation of a user activity. Specifically, the present invention leverages unified accumulated authentication data (captured independent from the user initiating the user activity and prior to the user taking an action associated with the user activity), encoded and transmitted over a period of time using different communication channels to validate user activities, while ensuring the integrity and continuity of the elastic authentication tokens/samples. Particularly, the invention utilizes multiple communication channels for transmitting the elastic authentication tokens arbitrarily over a period of time, all of which typically have to be present in a particular order and validated in combination at the time of the user activity for authentication. Even if an unauthorized entity accidentally interception/duplicates certain elastic authentication tokens during their arbitrary transmission, the intercepted tokens cannot be used for authentication for user activities without the remainder of the tokens being present in a particular tiered order and being validated cumulatively/collectively as a continuum of elastic authentication tokens.

Moreover, the invention employs novel integrity checks, verifying the captured elastic authentication token against the corresponding authentication credential capture signal to ensure the legitimacy of the credential, using three separate levels of validation. Again, even if an unauthorized entity accidentally interception/duplicates the captured elastic authentication token during its arbitrary transmission, the intercepted tokens typically cannot be used for authentication for user activities without validating against the corresponding authentication credential capture signal. Again because the authentication credential capture signal may be transmitted at a random time, and the captured elastic authentication token may be relayed at any arbitrary time for authentication, unauthorized entities are not able to correlate the two communications. In addition, the elastic authentication tokens are configured to allow integrity checks to ensure that tampering/compromise during transmission did not occur.

In addition, the present invention utilizes random capture times for capturing the elastic authentication credentials, and also captures arbitrary type of credentials using arbitrary capture devices during the extended time period preceding the user activity. Hence, unauthorized entities are not able to determine/provide the specific elastic tokens captured prior to the user activity, in the required order, with the signatures of the capture devices, for authentication at the time of the user activity. Moreover, in some embodiments, the continuum of authentication credentials is "elastic" in that a plurality of elastic authentication tokens captured during an extended time period prior to initiation of a user activity are consolidated/compressed and validated in a particular way to form a single string or continuum of the credentials. Moreover, the present invention is technology agnostic (e.g., due to the instruction and metadata structure of the capture signal described below) and may be easily incorporated into existing systems.

Embodiments of the present invention address the above needs and/or achieve other advantages by providing apparatuses (e.g., a system, computer program product and/or other devices) and methods for providing elastic authentication based on a continuum of elastic authentication credentials, as will be described in detail elsewhere in the specification. FIG. 1 illustrates an authentication system environment 100, in accordance with some embodiments of the present invention. FIG. 1 provides a unique system that includes specialized servers and systems, communicably linked across a distributive network of nodes required to perform the functions of providing dynamic authentication paradigms. The authentication system provides a dynamic and secure platform for authorization based on validation of the continuum of elastic authentication credentials comprising cumulative tiered elastic authentication tokens captured during an extended time period prior to initiation of a user activity.

As illustrated in FIG. 1, a processing system 108, or authentication system 108 or application server is operatively coupled, via a network 101 to authentication credential capture device(s) 104 (also referred to as one or more capture devices 104 or a user device 104), to the user activity system 106 (e.g., a financial institution system 106) and to one or more secondary user systems 110. In this way, the processing system 108 can send information to and receive information from the user authentication credential capture device(s) 104, the user activity system 106 or financial institution server and a plurality of secondary users via the secondary user systems 110. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means.

In some embodiments, the user 102 is an individual that has a user device, such as a mobile phone, tablet, or the like and who seeks to perform one or more user activities. FIG. 1 also illustrates an authentication credential capture device(s) 104. The authentication credential capture device(s) may refer to a device or a combination of devices that are configured to capture (i.e., receive and/or process) one or more authentication credentials/elastic authentication tokens from the user such as a user device (e.g., a mobile device, a smart phone, a laptop computer and/or another computing device), smart devices (e.g., smart TVs, smart doors, smart speakers, personal digital assistant devices), wearable devices (e.g., smart watches, fitness devices, Virtual/Augmented Reality devices), GPS devices, proximity/location sensors/beacon devices, visual capture devices and/or the like to capture authentication credentials associated with the user. The user authentication credential capture device(s) 104 may be, for example, a desktop personal computer, a mobile system, such as a cellular phone, smart phone, personal data assistant (PDA), laptop, or the like. The user authentication credential capture device(s) 104 generally comprises a communication device 112 comprising input/output devices or sensors, a processing device 114, and a memory device 116. The user authentication credential capture device(s) 104 may comprise other devices that are not illustrated, configured for location determination/navigation (GPS devices, accelerometers and the like), for authentication (fingerprint scanners, microphones, iris scanners and the like), for image capture (cameras, AR devices and the like), for display (screens, hologram projectors and the like), and other purposes. The user authentication credential capture device(s) 104 is a computing system that enables the user to perform one or more user activities. The processing device 114 is operatively coupled to the communication device 112 and the memory device 116. The processing device 114 uses the communication device 112 to communicate with the network 101 and other devices on the network 101, such as, but not limited to the user activity system 106 and the processing system 108. As such, the communication device 112 generally comprises a modem, server, or other device for communicating with other devices on the network 101.

The user authentication credential capture device(s) 104 comprises computer-readable instructions 120 and data storage 118 stored in the memory device 116, which in one embodiment includes the computer-readable instructions 120 of a capture device application 122. In some embodiments user authentication credential capture device(s) 104 may refer to multiple user devices that may be configured to communicate with the authentication system and/or the financial institution system via the network 101. The capture device application 122 may be a standalone application configured for receiving, processing and/or transmitting elastic authentication tokens or the capture device application 122 may refer to one or more existing applications on the user device. In some embodiments the processing system 108 and/or the financial institution system may transmit control signals to the user device, configured to cause the capture device application 122 to perform one or more functions or steps associated with elastic authentication, for example, causing the application to trigger one or more sensors or input devices of the capture device 104 to capture an authentication credential based on instructions receiving in an capture signal from the processing system 108.

As further illustrated in FIG. 1, the processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the user activity system 106, the authentication credential capture device(s) 104 and the secondary user systems 110. As such, the communication device 146 generally comprises a modem, server, or other device for communicating with other devices on the network 101.

As further illustrated in FIG. 1, the processing system 108 comprises computer-readable instructions 154 stored in the memory device 150, which in one embodiment includes the computer-readable instructions 154 of an elastic authentication application 158. In some embodiments, the memory device 150 includes data storage 152 for storing data related to the system environment, but not limited to data created and/or used by the elastic authentication application 158. In some embodiments, executing the computer readable instructions of the elastic authentication application 158 causes the processing device 148 to perform one or more steps for elastic authentication described herein. In some embodiments, the elastic authentication application 158 may comprise various component applications or parts 158A-D, one or more of which may reside of the memory device 150 or on other external systems (e.g., the user activity system) in operative communication with the processing system 108. The elastic authentication credential capture signal generator application 158A is configured for generating an elastic authentication credential capture signal, as described with respect to FIGS. 2 and 4. The elastic authentication credential capture signal sender application 158B is configured for transmitting the elastic authentication credential capture signal, as described with respect to FIGS. 2 and 4. The elastic authentication token validation application 158C is configured for validating received elastic authentication tokens, as described with respect to FIG. 4. The elastic authentication continuum validation application 158D is configured for validating the constructed continuum of tokens, as described with respect to FIG. 4.

In the embodiment illustrated in FIG. 1 and described throughout much of this specification, the elastic authentication application 158 may request and receive elastic authentication tokens from the capture devices 104. In some embodiments, the processing system 108 may retrieve user authentication information, capture device information, financial information and the like from the user activity system 106 and/or the capture devices 104. In this way, the elastic authentication application 158 may communicate with the user activity system 106, the user authentication credential capture device(s) 104, secondary user system 110, merchant systems and other third party systems.

In some embodiments, the elastic authentication application 158 may control the functioning of the user authentication credential capture device(s) 104. In some embodiments, the elastic authentication application 158 computer readable instructions 154 or computer-readable program code, the when executed by the processing device 148, causes the processing device to perform one or more steps involved in assessing authentication requirements and/or transmit control instructions to other systems and devices to cause the systems and devices to perform specific tasks.

As illustrated in FIG. 1, the user activity system 106 is connected to the processing system 108 and is associated with a financial institution network. The user activity system 106 may refer to a financial institution system, a transaction terminal or other devices or systems associated with performing the sure activity. In this way, while only one user activity system 106 is illustrated in FIG. 1, it is understood that multiple network systems may make up the system environment 100. The user activity system 106 generally comprises a communication device 136, a processing device 138, and a memory device 140. The user activity system 106 comprises computer-readable instructions 142 stored in the memory device 140, which in one embodiment includes the computer-readable instructions 142 of an user activity application 144. The user activity system 106 may communicate with the processing system 108 to indicate initiation of a user activity by the user, request validation of authentication credentials and the like. The processing system 108 may communicate with the user activity system 106 via a secure connection 160 generated for secure encrypted communications between the two systems. In some embodiments, the secure connection 160 may be an operative communication link/channel established via the network 101.

The secondary user system 110 may be similar to the user authentication credential capture device(s) 104 and/or the user activity system 106. The secondary user system 110 may comprise a communication device 166, a processing device 168, and a memory device 170. The memory device 170 may further comprise computer readable instructions 172, that when executed by the processing device 168, cause the historical activity data application 174 to transmit activity data concerning historical exposure events to the processing system 108.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 2, a high level process flow 200 is provided for providing elastic authentication based on a continuum of elastic authentication credentials. The process flow 200 is directed to, in general, a secure platform for authorization based on validation of the continuum of elastic authentication credentials comprising cumulative tiered elastic authentication tokens captured during an extended time period prior to initiation of a user activity. In this regard, the system may generate and transmit elastic authentication credential capture signals structured to cause authentication credential capture devices to initiate collection of one or more elastic authentication tokens, as illustrated by block 202. These one or more elastic authentication tokens (e.g., first and second elastic authentication tokens described below) are captured, ahead of time, prior to and independent of the user initiating a user activity or undertaking actions associated with the user activity. As discussed, the user activity may comprise one or more activities associated with an entity (e.g., a financial institution) described previously. In this regard, the system may employ authentication credential capture devices (104) such as a user device (e.g., a mobile device, a smart phone, a laptop computer and/or another computing device), smart devices (e.g., smart TVs, smart doors, smart speakers, personal digital assistant devices), wearable devices (e.g., smart watches, fitness devices, Virtual/Augmented Reality devices), GPS devices, proximity/location sensors/beacon devices, visual capture devices and/or the like to capture authentication credentials associated with the user.

The authentication credential capture devices are configured to capture elastic authentication credentials in accordance the instructions/signals received from the system (e.g., processing system 108). For example, the system is configured to cause the authentication credential capture devices to capture one or more elastic authentication credentials tokens by transmitting the elastic authentication credential capture signals. As discussed, the elastic authentication credentials may refer to one or more of authentication credentials of various "credential types" such as biometric credentials (e.g., fingerprint scans, iris scans, images/videos of the user for facial recognition and/or gesture recognition, voice/audio samples of a predetermined length for voice recognition, vital signs such as heart rate of the user and the like), identifiers associated financial/payment credentials (e.g., credit/debit card or account numbers, electronic tokens associated with digital wallets and the like), usernames and associated passwords/passcodes, and associated PINs or Passwords, username accompanied by a one-time passcode generated/provided on another linked user device (e.g., a wearable device operatively coupled via a NFC connection, another device within a predetermined proximity of the user), position or location data of the user (for example, based on GPS or location signals obtained from a user mobile device, proximity marker signals received from beacon devices, and the like), and/or other authentication credentials.

Typically, the system establishes an operative communication link with each of the authentication credential capture devices, and the elastic authentication credential capture signal is transmitted via this communication link. In this regard, the system may be overarching and may be configured to control one or more applications, operating system, user interface and other functionality associated with the authentication credential capture devices by transmitting control signals/instructions through the communication link. For example, the system is configured to cause the authentication credential capture devices to capture one or more elastic authentication credentials tokens by transmitting the elastic authentication credential capture signals.

In some embodiments, establishing an operative communication link with the authentication credential capture device comprises identifying the authentication credential capture device and/or authentication credential capture device information (e.g., device type, compatible credential types, user permissions associated with the device and the like). The authentication credential capture device may be identified by gathering device identification information from the mobile device to generate the device's "fingerprint," or unique signature of the authentication credential capture device. Device identification information may be collected from a variety of sources. In some embodiments, the device identification information includes an identification code. The identification code may be but is not limited to a serial number or an item number of the device. In some embodiments, the device identification information may be associated with a chip associated with the authentication credential capture device. The chip may be, but is not limited, to a subscriber identification module (SIM) card, removable hard drive, processor, microprocessor, or the like. In other embodiments, the device identification information may be associated with a removable part of the authentication credential capture device. Removable parts include but are not limited to detachable keyboards, battery covers, cases, hardware accessories, or the like. Removable parts may contain serial numbers or part numbers. In alternative embodiments, a unique key, code, or piece of software provided by a financial institution or another authorized entitiy may be downloaded onto the authentication credential capture device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the authentication credential capture device (e.g., mobile device), for example, without requiring user input (e.g., based on prior permissions from the user). For example, the device identification information may be automatically provided by the authentication credential capture device. The device identification information may be stored, associated with the user profile (user profile comprising user authentication information, user authorization, user preferences and the like) and subsequently used to identify suitable authentication credential capture devices for capturing the elastic authentication credentials.

As illustrated by block 202, the system is configured to generate and transmit elastic authentication credential capture signals structured to cause authentication credential capture devices to initiate collection of multiple elastic authentication tokens. These signals are typically transmitted independent of and prior to the user initiating a user activity. In some embodiments, the system is configured to generate a first elastic authentication credential capture signal structured to cause a first authentication credential capture device to initiate collection of one or more elastic authentication tokens, e.g., a first elastic authentication token, independent of the user initiating a user activity and prior to the user taking an action associated with the user initiating a user activity. Similarly, the system is configured to generate a second elastic authentication credential capture signal structured to cause a second authentication credential capture device (e.g., the first authentication credential capture device or another authentication credential capture device) to initiate collection of one or more elastic authentication tokens, e.g., a second elastic authentication token and a third elastic authentication token. In some embodiments, the system is configured to generate/transmit an elastic authentication credential capture signal for each elastic authentication credential associated with the user to be captured by a capture device, while in other embodiments, the system is configured to transmit generate/transmit an elastic authentication credential capture signal for multiple elastic authentication credentials associated with the user to be captured by a capture device.

As discussed, the one or more tokens (e.g., first, second and/or third elastic authentication tokens) are captured (e.g., by the authentication credential capture devices) independent of initiation of a user activity by the user and prior to the user performing an action associated with initiation of the user activity. For example, the user may log into an application for a session on a user device by providing authentication credentials, responses to challenge questions and the like, associated with the application, and then initiate a user activity using the application. Here, capturing the one or more elastic authentication tokens independent of initiation of the user activity refers to capturing one or more elastic authentication tokens (e.g., first, second and/or third elastic authentication tokens), (i) ahead of time, before the user provides authentication credentials and responses to challenge questions for logging into the application (or before the user provides an instruction for the activity if the user is already logged in for an predetermined extended session, e.g., a login session extending over 5 days), and (ii) separate from and not withstanding these authentication credentials and responses to challenge questions for logging into the application. In some embodiments, at the time of capturing the one or more elastic authentication tokens (e.g., first, second and/or third elastic authentication tokens), the system may not be aware or may not anticipate that the user would initiate a particular activity and a particular future time (e.g., a third time) or that the captured credentials would be employed to authenticate a particular user activity. As another example, the user may initiate a user activity (e.g., a balance transfer at an ATM, a purchase at a transaction terminal) by swiping a credit or debit card. Here, the one or more elastic authentication tokens (e.g., first, second and/or third elastic authentication tokens) are captured separate from and prior to the user swiping the credit or debit card. The system typically constructs the captured signal such that the one or more tokens are captured independent of initiation of a future user activity by the user and prior to the user performing an action associated with initiation of the user activity in the future.

In some embodiments, generating the elastic authentication credential capture signal comprises constructing the capture signal based on determining (i) required credential types and/or (ii) suitable authentication credential capture devices. For example, the system may determine that, based on user preferences, that geographic location credentials (e.g., current location, or travel patterns), or user challenge/action based credentials (e.g., requiring an audio credential sample of the user repeating a certain arbitrary phrase for a certain number of times, or requiring the user to travel to a particular location, such as the user's residence location, within a specified time period) are required/preferred. As another example, the system may determine that the user is currently proximate to or actively communicating with a particular authentication credential capture device such as a proximity marker beacon or a mobile device associated with the user and choose to generate the elastic authentication credential capture signal to cause the identified device to initiate capture of the elastic authentication credential. As yet another example, the system may first identify a required credential type, for example, based on authentication levels required for typical/usual activities of the user, and determine the suitable credential capture devices that are capable of capturing the desired credentials. For instance, based on determining that the user's usual activities include financial activities or transactions which require a high level of authentication, the system may identify biometric credentials as suitable credential type for the desired high level of authentication. Consequently, the system may identify one or more authentication credential capture devices associated with the user or proximate the user (either currently or devices that will likely be proximate the user during the time period of credential capture) that are capable of capturing the requisite biometric credentials, such as a user mobile device, a suitable transaction terminal and the like. The system may then choose a first authentication credential capture device of the one or more identified capable authentication credential capture devices to capture the elastic credential token(s), for example based on user preferences, user activity on the device, minimal disturbance to the user and the like. Also, the system may choose a second authentication credential capture device of the one or more identified capable authentication credential capture devices to capture another elastic credential token(s).

As discussed previously, the system typically generates a first elastic authentication credential capture signal structured to cause a first authentication credential capture device to initiate collection of one or more elastic authentication tokens. The system may also subsequently generate similar second signal, third signal, fourth signal, and so on. The elastic authentication credential capture signal is described in detail with respect to FIG. 4 later on. In addition, the system may establish an operative communication link with the first authentication credential capture device (and/or other capture devices) associated with a user. The system may then transmit, via the operative communication link, the first elastic authentication credential capture signal to the first authentication credential capture device. The first elastic authentication credential capture signal is structured to cause the first authentication credential capture device to initiate capture of a first elastic authentication token of the one or more elastic authentication credentials at a first time period. The first time period typically occurs before the user even initiates the transaction. Similarly, the system may transmit, via the operative communication link, a second elastic authentication credential capture signal (and a third signal, a fourth signal, and so on) to a second authentication credential capture device (or a third, fourth, or fifth capture device, or the like) which may be the a different device or the same device as the first authentication credential capture device, to capture a second elastic authentication token at a second time period succeeding the first time period. In some embodiments, the authentication credential capture device may refer to a sub-system that in turn transmits the elastic authentication credential capture signal to respective capture devices, for example, based on time of capture of credentials.

As used herein, a time period may refer to an interval or duration of time during which an activity or a process step described herein is initiated, performed or at least partially completed. The time period typically precedes the initiation of the user activity. In some embodiments, the time period may refer to a particular time instance (e.g., approximately or about 5:00 PM (e.g., with a tolerance of 0-2 seconds)), and/or a time interval (e.g., 5:00 PM to 5:05 PM, 8:00 AM to 10:00 AM, an interval of 6 seconds, an interval of 2 minutes, an interval of 3.5 hours, and the like). Moreover, as used herein, a first time period preceding a second time period (or the second time period succeeding the first time period) may refer to (i) the second time period immediately following the first time period (e.g., time periods 2:00 PM-2:50 PM and 2:51 PM-6:00 PM, time periods 11:22:01 AM and 11:22:02 AM-11:30 AM, consecutive time intervals of 5 minutes each, and the like), (ii) the second time period at least partially overlapping the first time period (e.g., time periods 2:00 PM-2:50 PM and 2:50 PM-3:00 PM, time periods 7:00-8:00 AM and 7:59 AM), or (iii) the second time period beginning a predetermined interval after the completion of the first time period (e.g., time periods 9:00:00 AM-9:00:30 AM and 11:51 AM-11:52 PM, alternate intervals of about 20 minutes, time periods occurring about every hour, the first time period beginning 30 minutes after a particular time instance and the second time period beginning or occurring at 4 hours after the end of the first time period, and the like).

The elastic authentication credential capture signal typically comprises a credential parameter component comprising a time period parameter and a credential type parameter. The time period parameter indicates the time at which the credential is to be captured and the credential type parameter the type of credential to be captured (independently of, separately from and prior to initiation of a future user activity). For example, based on the credential parameter component of a first capture signal, a first capture device (e.g., a user mobile device) may request that the user provide a fingerprint scan (credential type) at a first time period (e.g., currently/in real-time, within 20 minutes of receipt of the signal at the capture device, at 6:20 PM, when the user next turns the mobile device on, or at a random/arbitrary time period based on the time period parameter). As another example, based on the credential parameter component of a second capture signal, a second capture device (e.g., a user wearable device having positioning capability, or a proximity marker/beacon device) may request that the user walk a few steps to a particular location and capture the associated location/position credentials at a second time period occurring after the first time period (e.g., currently/in real-time, at 7:15 PM, at a random/arbitrary time period occurring after the first time period, or five separate credentials captured in random time intervals after the first time period). Here, the system may transmit the first and second signals (and/or third signal, fourth signal . . . and so on) simultaneously or one after another. For example, the system may transmit the second capture signal after the first elastic authentication token associated the first capture signal has been captured from the user. The elastic authentication credential capture signal is described in detail with respect to FIG. 4 later on.

In some embodiments, transmitting the first elastic authentication credential capture signal via the operative communication link, further comprises transmitting the signal in parts which may be recombined at the capture device, to reduce to mitigate any interceptions. Here, the system may transmit a first portion of the first elastic authentication credential capture signal to the first authentication credential capture device, via a first operative communication channel. The system may also transmit a second portion of the first elastic authentication credential capture signal to the first authentication credential capture device transmitting, via a second operative communication channel. The portions may be encoded and transmitted at the same time or one after another.

The system may receive the first elastic authentication token associated with the user from the first authentication credential capture device, as illustrated by block 204. As discussed, the first elastic authentication token is captured by the first authentication credential capture device, during the first time period in accordance with the first capture signal. As such, the first elastic authentication token, captured at the first time period, may be received at the system, in real-time after the completion of the capture, a predetermined time interval after capture, or at another suitable time (e.g., after initiation of a user activity at a time succeeding the first time period (block 208)). Moreover, the system may receive a second elastic authentication token associated with the user from the second authentication credential capture device, as illustrated by block 206. As discussed, the second elastic authentication token is captured by the second authentication credential capture device, during the second time period in accordance with the second capture signal. As such, the second elastic authentication token, captured at the second time period, may be received at the system, in real-time after the completion of the capture, a predetermined time interval after capture, or at another suitable time (e.g., after initiation of a user activity at a time succeeding the first time period (block 208), before or after receipt of the captured first elastic authentication token, and the like). The system may receive a third elastic authentication token, a fourth elastic authentication token, and so on, captured after the second time period, in a similar manner.

In some embodiments, the first elastic authentication credential capture signal is configured to capture the first elastic authentication token at the first time period such that (i) the first time period occurs at an unscheduled arbitrary time period (for example, by employing a randomize function) to increase unpredictability of the signal/credentials by unauthorized entities, or (ii) the first time period is a predetermined time period (e.g., at 7:45 AM, or during a particular time interval). Similarly, in some embodiments, the second elastic authentication token is captured during a second time period (i) occurring after a time interval of an arbitrary length following the first time period (e.g., after a time interval of a random length triggered by a randomize function), or (ii) occurring after a time interval of a predetermined length following the first time period (e.g., after 20 minutes, or at 10:00 AM).

Typically, the authentication credential (e.g., a gesture video sample of the user performing a particular gesture requested by the system, location data associated with the system requesting the user to visit a particular location or walk a predetermined number of steps in a particular direction, biometric data, auxiliary user data, voice print of the user, etc.) captured by the authentication credential capture device is tokenized by the capture device, by a storage sub-system (described below), and/or by the system at: the capture device, the storage sub-system, the system, and/or during transmission through the operative communication link. The structure of the elastic authentication token is described in detail with respect to FIG. 4.

As illustrated by block 208, the system typically receives a request or an indication to execute a user activity at an arbitrary time after the credentials have been captured by the capture devices, e.g., at a third time period succeeding the second time period. For example, the request or indication may be received from the user activity system 106 (e.g., a financial institution system or a transaction terminal processing the user activity) or from a user mobile device using which the user is performing the user activity and the like. As discussed previously, initiation, performance and/or completion of user activities typically requires authorization of the user based on validation of the user's authentication credentials.

As alluded to previously, the system may receive the captured elastic authentication tokens from the authentication credential capture devices at any suitable time. In some embodiments, some or all of the captured authentication tokens from one or more of the capture devices are received (and/or retrieved/requested) by the system in real time or within a predetermined time period of the capture. In some embodiments, some or all of the captured authentication tokens from one or more of the capture devices are received (and/or retrieved/requested) by the system at predetermined specific times or during time intervals. In some embodiments, one or more of the captured authentication tokens from one or more of the capture devices are received (and/or retrieved/requested) by the system in response to identifying that the user seeks to initiate or execute a user activity requiring authentication of the user. For example, the first elastic authentication token captured during the first time period is received by the system or transmitted from the first authentication credential capture device: (i) within a predetermined time after the first time period of capture by the capture device, (ii) in real-time during the first time period after capture, or (iii) after receiving a request to execute the user activity at the third time period succeeding the first time period. Here, in some embodiments, the system transmits a token request signal, via the operative communication link, to the first authentication credential capture device to cause the capture device to transmit the previously captured credential (e.g., in response to receiving the request to execute the user activity at the third time period), such as the elastic authentication token captured during the first time period. In some embodiments, the capture device transmits a notification to the system after successful capture of the elastic authentication tokens, and the token request signal may be transmitted by the system in response to the capture notification, or alternatively, the notification may be accompanied by the captured token.

In some embodiments, the authentication credential capture device is configured to transmit and store one or more of the captured elastic authentication tokens at a storage sub-system such as a database, hub or memory location associated with the authentication credential capture device (for example temporarily for a predetermined time period, or until the tokens are retrieved by the system from the storage sub-system/hub). The captured elastic authentication tokens may be transmitted and stored at the storage sub-system by the capture device, and/or retrieved by the system at any suitable time after capture, as described above. In some embodiments, for example in the instances where the capture device is unable to establish an operative communication link/channel with the system or where the capture device is offline, the capture device may transmit and store one or more of the captured elastic authentication tokens at the storage sub-system which the capture device is able to establish a connection. For example, the storage sub-system may be a device on a local network of the capture device, different from another network used to connect with the system. Typically, the storage sub-system is a secure system, for example a system that only allows the system to access the data and not any other external devices/systems. In such instances, the system transmits the token request signal to the storage sub-system and receives the token stored therein, for example, in response to device signature certificate verification. Hence, the security of the captured elastic authentication token can be maintained even when the captured device is unable to connect to the system, and the possibility of access of the tokens from the capture device by unauthorized entities (systems or individuals), is mitigated. As such, the security of elastic authentication tokens captured during the extended time period preceding the transaction can be maintained even if the capture device is misplaced/lost or tampered with by unauthorized entities.

Next, at block 210, the system typically constructs a continuum of elastic authentication credentials from the received elastic authentication tokens captured during the extended time period preceding the transaction. For example, the system may construct a continuum of elastic authentication credentials using the first elastic authentication token captured during the first time period and the second elastic authentication token captured during the second time period. As discussed, the first time period and second time period typically precede the third time period of receiving a request to execute the user activity. A "continuum" as used herein may refer to a string token, an authentication string constructed using the captured elastic authentication tokens captured during the extended time period preceding the user activity, a stringed sample of the tokens formed by intrinsically linking the captured elastic authentication tokens in a particular order (e.g., chronological order of capture), and the like. An illustrative representation of the continuum of elastic authentication credentials or tokens 300A is illustrated in FIG. 3A. Constructing the continuum of elastic authentication credentials typically involves first, second, third and/or lateral levels of validation, described later on with respect to FIG. 4.

Next, at block 212, the system is configured to authorize the user for the user activity at the third time period based on at least the successful validation of the continuum of elastic authentication credentials captured during the extended time period prior to receiving a request to execute the user activity, e.g., at the third time period. In some embodiments, validation of the continuum of elastic authentication credentials comprises first, second, third and/or lateral levels of validation, described later on with respect to FIG. 4. In some embodiments, validation of the continuum of elastic authentication credentials comprises assigning ranks to each of the tokens in the continuum (e.g., based on confidence of the security/veracity of the credential and/or capture device associated with the credential, based on historical data, based on user/system preferences, etc.) and evaluating the credentials cumulatively. In some embodiments, validation of the continuum of elastic authentication credentials comprises determining whether the continuum of elastic authentication credentials matches a required quorum of elastic authentication tokens for the user activity. Here, the system may determine a "required quorum" of elastic authentication tokens for the user activity that the user seeks to include, comprising a required number of tokens, a required credential type of tokens, the duration of the extended time period of capture preceding the user activity, and/or rank associated with the token, which cumulatively provide the desired level of authentication/authorization or confidence for securely performing the user activity. The continuum of elastic authentication credentials may be validated, at least in part, based on determining that the tokens in the continuum cumulatively meet the required quorum criteria.

In some embodiments, validation of the continuum of elastic authentication credentials is based on cumulative validation of the tokens in the continuum. Here, the system may check/analyze the continuum for points of changes, compromise of one or more of the tokens, unauthorized access, conflicting token credentials, and/or the like. For example, the system may return unsuccessful validation of the continuum based on identifying a conflict, e.g., two tokens with geographic position/location credentials of the user, captured within 5 minutes of each other, with the geographic locations of the user indicated by the two tokens being 120 miles apart. As another example, a first token may comprise a voice sample of the user with the user reading out a series of words presented by the system via the capture signal, and a second token may comprise a voice sample of the user providing an audio command to a personal digital assistant application. The system may validate the first and second tokens (and/or the continuum) based on identifying that the voice patterns/markers/identifiers of the user are consistent.

In some embodiments, validation of the continuum of elastic authentication credentials is based on credentials or activities of another auxiliary user associated with the user. Here, the system may validate credentials of the user based on matching/comparing the user credentials with that of an auxiliary user (e.g., a known/trusted auxiliary user associated with the user, a relative of the user, a parent, a child, etc.), for example, using a hybrid continuum of elastic authentication credentials 300B described with respect to FIG. 3B. For example, the system may validate a second elastic authentication token of the continuum comprising a position location credential of the user captured at a time period of 2:03 PM (and/or the continuum of elastic authentication credentials in its entirety), based on identifying that an auxiliary authentication token comprising a location/position of the auxiliary user captured within a predetermined time period (e.g., 1 minute, 5 minutes etc.) of the second token of the user matches the location/position of the user. For instance, the system may validate the second elastic authentication token of the continuum comprising a position location credential of the user (and/or the continuum of elastic authentication credentials in its entirety) based on identifying an intersection with an auxiliary continuum of the auxiliary user (e.g., based on determining that the auxiliary user was located proximate the same location of the second token within a predetermined time of the token capture). In some embodiments, the system may construct an auxiliary continuum of elastic authentication credentials associated with the auxiliary user. This auxiliary continuum of elastic authentication credentials comprises one or more elastic authentication tokens associated with the auxiliary user, similar to the tokens and continuum described previously. As such, the system may authorize the user for the user activity based on at least the successful validation of the continuum of elastic authentication credentials associated with the user, in combination with the auxiliary continuum of elastic authentication credentials associated with the auxiliary user (e.g., based on comparison, identifying an intersection, etc.).

Any combination of the validation means and methods described herein may be employed by the system. At least a portion of the tokens in the continuum may be validated by the system, in real-time of receipt from the capture device or the storage sub-system, at a predetermined scheduled time, and/or in response to receiving the request/indication regarding initiation of the user activity. Consequently, the system allows or authorizes the user to execute the user activity based on at least the successful authorization of the user, as indicated by block 214, i.e., based on validation of the continuum described above.

However, the system may reject/block or not authorize the user activity if the user is not authorized, for example, based on an unsuccessful validation of the tokens and/or the continuum. In some embodiments, as discussed, the system determines whether the continuum of elastic authentication credentials matches a required quorum of elastic authentication tokens for the user activity. Based on determining that the continuum of elastic authentication credentials does not match the required quorum of elastic authentication tokens for the user activity, e.g., based on successful validation of a portion of the continuum or based on fewer tokens being present in the continuum than the required quorum, the system may seek additional tokens to meet the required quorum. For instance, the system may identify a third elastic authentication token associated with the user captured prior to the third time period of receiving a request to execute the user activity, such that the third elastic authentication token together with the continuum of elastic authentication credentials matches the required quorum of elastic authentication tokens for the user activity. Alternatively, the system may request a third elastic authentication token/credential from the user, such that the third elastic authentication token together with the continuum of elastic authentication credentials matches the required quorum of elastic authentication tokens for the user activity. Next, the system may augmenting/append the continuum of elastic authentication credentials with the third elastic authentication token, for example, by intrinsically linking the third token with the first or second token, as appropriate. Alternatively, the system may re-issue an invalidated token.

In some embodiments the require quorum relates to a confidence score that can be used to grant tiered access, authorization, entitlements and other action to the user. For example, at least 45 of 50 token credentials (confidence score of 90%) of a continuum are required to be validated successfully for authorizing the user activity.

FIG. 3A depicts illustrative representation of the continuum of elastic authentication credentials or tokens 300A, in accordance with some embodiments of the invention. As discussed, the system typically constructs, for example using the elastic authentication continuum validation application 158D, a continuum of one or more elastic authentication credentials or tokens 310 from the received elastic authentication tokens captured during the extended time period preceding the transaction. A "continuum" as used herein may refer to a string token, an authentication string constructed using the captured elastic authentication tokens captured during the extended time period preceding the user activity, a stringed sample of the tokens formed by intrinsically linking the captured elastic authentication tokens in a particular order (e.g., chronological order of capture, based on ranking of the tokens, etc.), and the like. FIG. 3A illustrates a continuum of elastic authentication credentials 300A comprising, "N" number of intrinsically linked captured elastic authentication tokens 310(I)-310(N), collected over an extended time period preceding the user activity (e.g., over unscheduled or arbitrary time frames and intervals). Each pair of tokens may be intrinsically linked (e.g., using their corresponding credential key sub-components described below) such that no token can be validated without the other. The structure and process of constructing and validating the tokens 310 are described with respect to FIG. 4 below.

FIG. 3B schematically depicts an illustrative representation of a hybrid continuum of elastic authentication credentials 300B, in accordance with some embodiments of the invention. Similar to the continuum 300A illustrated in FIG. 3A, in some embodiments, the system is configured to construct a hybrid continuum of elastic authentication credentials 300B or a hybrid string token 300B using elastic authentication tokens captured during the extended time period preceding the user activity from a plurality of auxiliary users (e.g., known/trusted auxiliary users associated with the user, a relative of the user, a parent, a child, etc.). As discussed previously, in some embodiments, validation of the continuum of elastic authentication credentials is based on credentials or activities of one or more auxiliary users associated with the user. Here, the system may validate credentials of the user and/or the one or more auxiliary users based on matching/comparing/correlating the user credentials/tokens with that of the auxiliary users, construct the hybrid continuum 300B, and allow the user and/or the one or more auxiliary users (and/or other secondary users) to perform one or more user activities based on validating the hybrid continuum and/or one or more of the tokens within. FIG. 3B illustrates a hybrid continuum of elastic authentication credentials 300B having elastic authentication tokens associated with the user 310 and elastic authentication tokens associated with an auxiliary user 320, although, it is understood that elastic authentication tokens associated with other auxiliary user (e.g., 330, 340 (not illustrated)) may also be employed to construct the hybrid continuum 300B. FIG. 3B illustrates the hybrid continuum of elastic authentication credentials 300B comprising, "N" number of captured elastic authentication tokens 310(I)-310(N) associated with the user collected over an extended time period preceding the user activity (e.g., over unscheduled or arbitrary time frames and intervals), and "M" number of captured elastic authentication tokens 320(I)-320(M) associated with the auxiliary user collected over an extended time period preceding the user activity and/or an auxiliary user activity (e.g., over unscheduled or arbitrary time frames and intervals). The elastic authentication tokens may be arranged/linked in any suitable order (e.g., chronologically, based on confidence score, based on ranking, user preferences, based on authentication levels provided, etc.). Each pair of tokens may be intrinsically linked (e.g., using their corresponding credential key sub-components described below) such that no token can be validated without the other. The structure and process of constructing and validating the tokens (310, 320) are described with respect to FIG. 4 below.

FIG. 4 illustrates a schematic depiction 400 of the structure and process flow for constructing and validating one or more elastic authentication tokens (e.g., first elastic authentication token 310-(I) and second elastic authenticator token 310-(II)), in accordance with some embodiments of the invention. As discussed with respect to block 202 of FIG. 2, the system (i.e., the processing system 108) is configured to construct and transmit elastic authentication credential capture signals to respective authentication credential capture devices 104. In some embodiments, the system generates the capture signal, using the elastic authentication credential capture signal generator application or module 158A, which may be a read-only application/module/device, in that the application/module 158A only generates and transmits the signal and does not allow any inputs to the module 158A to prevent tampering of the generator application. For example, the system generates and encodes the capture signal, using the elastic authentication credential capture signal generator application or module 158A, directing a capture device to request the user to perform some alternating or varied task at various time periods of credential collection.

For each elastic authentication credential capture signal, the system generates a credential parameter component (302(I), 302(II)) based on the desired type of credential to be captured and/or the capture device utilized. For example, the system generates a first capture signal for the first token 310-(I) and a second capture signal for the second token 310(II). The credential parameters typically comprise a time period parameter indicating the time period of capture (e.g., a predetermined/scheduled time, an arbitrary time, a randomization function code for capturing credentials at arbitrary times/intervals) and a credential type parameter indicating the type, length/size, and other attributes of the credential to be captured (e.g., a voice sample type of a predetermined length with the user being requested to read aloud a predetermined series of words in a random order, a particular username/password credential, etc.).

The system may then generate a source security metadata component (304(I), 304(II)) which is typically configured to be utilized for ascertaining compromise of the elastic authentication credential capture signal. For instance, the source security metadata component (304(I), 304(II)) may be constructed by the system using the authentication credential capture signal generator application or module 158A and/or the authentication credential capture signal sender application or module 158B. In some embodiments, the source security metadata component (e.g., 304(I)) comprises a cyclic redundancy check (CRC) code, hash computation, and/or a checksum associated with the elastic authentication credential capture signal, which may be checked against corresponding CRC code or checksum of a received token to determine if the token and/or the capture signal has been tampered with by unauthorized individuals. In some embodiments, the source security metadata component (e.g., 304(I)) comprises a trigger code that is configured to cause the corresponding authentication credential capture device (e.g., first capture device) to arbitrarily modify the credential type parameters and/or the time period parameters for collection of the one or more elastic authentication tokens at predetermined intervals of time. For instance, the trigger code when executed by the capture device may cause the capture device to automatically change the credential capture actions, for example every "t" number of minutes, to increase unpredictability by unauthorized individuals.

The system may then generate a credential key pair for each capture signal. The credential key pair comprises a source credential key sub-component (306(I), 306(II)) (e.g., a private key) and a corresponding complementary target credential key sub-component (316(I), 316(II)) (e.g., a public key). Typically, the source credential key sub-component (e.g., 306(I)) and the target credential key sub-component (e.g., 316(I)) are complementary and are structured to be utilized together to validate the one or more elastic authentication tokens. Determining absence or tampering of either one of the sub-components of the pair (e.g., 306(I) and 316(I)) would typically cause the system to return an unsuccessful validation of the token and reject the token and/or the associated continuum. In some embodiments, the source credential key sub-component and the target credential key sub-component of the credential key pair are similar to public and private keys utilized in a certificate signing request (CSR), respectively. In some embodiments, the source credential key sub-component and the target credential key sub-component of the credential key pair are structured in accordance with asymmetric public and private keys employed in public-key cryptography for communication between the system and the capture device, respectively. In some embodiments, the source credential key sub-component and the target credential key sub-component of the credential key pair are structured in accordance with symmetric public and private keys of Pretty Good Privacy (PGP) encryption program for communication between the system and the capture device, respectively.

Next, the system typically constructs the elastic authentication credential capture signal (e.g., first capture signal for capture of the first token 310-(I)) having the credential parameter component (e.g., 302(I)) encoded within. Typically, the system transmits the elastic authentication credential capture signal having the credential parameter component (e.g., 302(I)) to the authentication credential capture device (e.g., first capture device) along with the target credential key sub-component (e.g., 316(I)). Although, in the instances where the target credential key sub-component is a public key of the capture device, the system may send the credential capture signal having the credential parameter component alone. In some instances, the source credential key sub-component (e.g., 306(I)) and/or the source security metadata component (e.g., 304(I)) are not transmitted to the first authentication credential capture device.

In some embodiments, the constructed capture signal is transmitted from the generator module 158A to the sender module 158B, where the generator module 158B employs various encryption technologies and channel distribution technologies for transmitting the capture signal to the capture device 104 to ensure unpredictable paths. These unpredictable paths may include sending the capture signal wholly, partly or in a tiered pattern to ensure that no unauthorized entity on one channel may intercept all of the signal capture portions. Moreover, the capture signal may be transmitted by the system, via the sender module 158B, using different hop or jump points or systems. In some embodiments, as discussed previously, the system encodes the elastic authentication credential capture signal, for example, based on the source security metadata component (304(I), 304(II)) and/or the source credential key sub-component (306(I), 306(II)), prior to transmission.

The authentication credential capture device typically captures the required authentication credential/token in accordance with the capture signal. The authentication credential capture device may then transmit the captured token to the system, as described with respect to blocks 204 and 206 of FIG. 2. The system may receive the elastic authentication token (e.g., first token 310-(I)) from the corresponding authentication credential capture device (e.g., first device). Typically, the received elastic authentication token comprises a captured credential component (312(I), 312(II)) having authentication credential data (e.g., fingerprint data, username/passcode data, electronic files associated with the captured credentials and the like) associated with the user that was captured by the device during the time period specified by the elastic authentication credential capture signal. Moreover, the received elastic authentication token typically comprises or is accompanied by a target security metadata component (314(I), 314(II)) configured to be utilized in conjunction with the source security metadata component (304(I), 304(II)) for ascertaining any compromise of the elastic authentication token. In addition, the system may also receive, from the capture device, the target credential key sub-component (316(I), 316(II)) that was initially transmitted to the capture device, or the capture device may eschew this.

Based on receiving or retrieving the captured authentication token, the system may validate the token at a suitable time, as described with respect to FIG. 2. Typically, the system performs (some or all of) three levels of validation of the received token along with a lateral validation of consecutive tokens before and/or after constructing the continuum of elastic authentication credentials or tokens.

As illustrated by FIG. 4, the system may perform a first level of validation involving matching the sub-components of the credential key pairs of an elastic authentication token to validate the token. The system may retrieve the source credential key sub-component (306(I)) associated with the generating the first elastic authentication credential capture signal of the first elastic authentication token 310-(I). The system may then identify a successful first level of validation based on determining that the source credential key sub-component (306(I)) complements, matches or interlocks with the target credential key sub-component (316(I)) received from the first authentication credential capture device.

In some embodiments, the system may also perform a second level of validation involving analyzing the metadata for indications of compromise or tampering (e.g., in response to a successful first level of validation). The system may retrieve the source security metadata component (304(I)) associated with the generating the first elastic authentication credential capture signal of the first elastic authentication token 310-(I). The system may identify a successful second level of validation based on determining that the source security metadata component (304(I)) (e.g., a tracer or hash) matches the target security metadata component (314(I)) received from the first authentication credential capture device.

In some embodiments, the system may also perform a third level of validation involving analyzing the captured credential data in light of previously known credentials of the user (e.g., in response to a successful first and/or second level of validation). In some embodiments, the third level of validation of the first elastic authentication token (310-(I)) comprises validating the captured credential component 312(I) comprising authentication credential data associated with the user.

In some embodiments, the system also performs a lateral validation of the token, e.g., a lateral validation of one token with regard to another adjacent token. In some embodiments, for example, the system may first perform the three levels of validation to validate the first token 310-(I). Next, to validate a second token 310-(II), the system may perform lateral validation against the first token 310-(I), either before or after the three levels of validation of the second token 310-(II). Identifying a successful lateral validation of the first elastic authentication token and the second elastic authentication token is typically based on determining that (i) the source credential key sub-component of the first elastic authentication token (306(I)) matches/points to a corresponding source credential key sub-component (306 (II)) (and/or the target component 316(II)) of the second elastic authentication token, and/or (ii) the target credential key sub-component of the first elastic authentication token (316(I)) matches/points to a corresponding target credential key sub-component (316(II)) (and/or the source sub-component 306(II)) of the second elastic authentication token. In this way, the system is able to verify if unauthorized tokens are inserted and identify the pertinent tokens to be utilized in constructing the continuum.

In this way, the system allows for various pre- and post-checks and validation of the tokens and is also configured to check the integrity of the captured credentials/tokens at different storage locations (e.g., at the capture device, storage sub-system, etc.). If a token defers within the multiple sites or systems (e.g., at the capture device, storage sub-system, etc.) it may be discarded, invalidated and/or re-issued.

In some embodiments, in addition to the encoding, tracers may be added to detect tampering, e.g., within the metadata component described previously. The tracers may also be used to indicate origination and transaction points to enhance audit trailing. The tracers could be "spread" across the sample encoding or split to prevent duplication. For example, the first capture device may have tracer ID of "12345" that is attached to broadcast location A1 of the device. This signature may incorporated as a part of the tokenization, so that if the data transmitted from the first capture device to a storage sub-system comprises tampered or missing data, then the storage sub-system may mark the received data as misplaced or possibly compromised.

In some embodiments, a discarded or invalidated token may cause the system to mark the entire associated continuum as compromised. A re-issue of a token may cause any previous sample to be discarded or marked as unusable. Moreover, the system, the capture devices, and/or the sub-systems may re-combine the tokens or perform validation of the tokens, at a particular intersection point/section based on the encoded data of the token.

As alluded to previously, the user is typically required to authenticate their identity in order to complete a user activity (e.g., an electronic transaction). Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user. The different types of authentication may provide differing degrees of confidence regarding the authentication using such types and thereby provide different levels of authentication. For example, if a username by itself is used for a first user authentication, and a username along with a password is used for a second authentication, then the second authentication should provide a higher confidence regarding the authentication because of the additional layer of authentication required. Therefore the second authentication is at a higher authentication level. Further, within the types of authentication, varying levels of confidence may be used. For example, when using a password, an administrator may require users to create a password according to strict rules designed to increase the security level of the password, and therefore increase the confidence/level of any authentication using the password.

Accordingly, a scale of authentication may be used to quantify (or dictate) the levels of authentication. Likewise, a scale of functions permitted may be used to quantify (or dictate) the number or context in which functions (e.g., types of activities) are permitted.

Referring to FIG. 5A, a scale of authentication 500A is illustrated according to embodiments of the invention. On the left-hand side of the scale, a "zero authentication"/lowest level of authentication requires no authentication credentials. On the right-hand side of the scale, a "hard authentication"/highest level of authentication requires full authentication credentials. This means that it requires the strictest combination or quorum of credentials or elastic authentication tokens. In between the two extremes, "a soft authentication" requires minimal credentials, moderate credentials or most credentials for various points along the scale. The scale generally represents the number of credentials required and/or the relative strength of the credentials required for that point on the scale. As discussed below with reference to FIG. 5C, the scale of authentication 500A may be coupled with a functions permitted scale 500B, first illustrated in FIG. 5B.

Referring to FIG. 5B, the functions permitted scale 500B illustrates various levels of functions (e.g., electronic activities) permitted. Functions may refer to what a user is permitted to "see" and/or what the user is permitted to "do". More specifically, this may refer to whether a specific function is permitted at a certain point on the scale and/or the context in which a certain function is permitted. The left-hand side of the scale indicates that no functions are permitted, and the right-hand side of the scale indicates that all functions are permitted. In between the extremes, minimal functions are permitted, moderate functions are permitted and most functions are permitted. Thus, any given point along the scale 500B corresponds with a certain amount and/or number of functions that are permitted and/or the context in which certain functions are permitted.

Referring now to FIG. 5C, a diagram 500C illustrates a coupling of the functions permitted scale 500B and the levels of authentication scale 500A. As shown, the scales 500B and 500A may be coupled with one another such that the various points along the scales intersect at specific points of the coupled scale. For example, one scale may be moved left or right with respect to the other scale in order to achieve a different relationship between the functions permitted and the credentials required. Accordingly, for a given coupling, a specific point on scale 500B provides that a particular function or functions may be permitted given that a specified level of authentication credentials are supplied, as indicated by the corresponding point on scale 500A. For example, the system, a financial institution and/or a user may arrange the scales 500B and 500A with respect to one another and may adjust the arrangement based on desired authentication levels or security requirements.

In some embodiments, one or both the scales 500B and 500A may have weighted scales such that, as a point on the scale is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased by modifying elastic authentication tokens combined to form the continuum that meets the quorum requirements. Also, if the user is typically required to provide a username and password to complete a type of activity, but the level of authentication required is higher for a particular user activity, then the user may be prompted to provide additional (e.g., secondary) authentication information, such as a PIN or a zip code associated with the user.

Referring now to FIG. 5D, a diagram 500D illustrates a relationship between the functions permitted and the authentication types. As shown in FIG. 5D, the soft authentication scale between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

As described with respect to FIGS. 2 and 3B, the system may authorize the user and/or other auxiliary users to perform user activities based on validating captured elastic authentication tokens captured from the user and/or other auxiliary users. The user and/or one or more of the auxiliary users may be granted full or partial access/authorization using the authorization level/functions permitted by a predefined elastic authentication token (one or more) of the continuum. For example, users who are dependents or children of a guardian auxiliary user, users who are employees, and the like, may be fully or partially authorized in this manner.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing elastic authentication based on a continuum of elastic authentication credentials, wherein the system provides a secure platform for authorization based on validation of the continuum of elastic authentication credentials comprising cumulative tiered elastic authentication tokens captured during an extended time period prior to initiation of a user activity, the system comprising:
   at least one memory device;
   at least one communication device connected to a distributed network;
   at least one processing device operatively coupled to the at least one memory device; and
   a module stored in the at least one memory device comprising executable instructions that when executed by the at least one processing device, cause the at least one processing device to:
      generate a first elastic authentication credential capture signal structured to cause a first authentication credential capture device to initiate collection of one or more elastic authentication tokens;
      establish an operative communication link with the first authentication credential capture device associated with a user;
      transmit, via the operative communication link, the first elastic authentication credential capture signal to the first authentication credential capture device, wherein the first elastic authentication credential capture signal is structured to cause the first authentication credential capture device to initiate capture of a first elastic authentication token of the one or more elastic authentication tokens at a first time period;
      receive, from the first authentication credential capture device, the first elastic authentication token associated with the user, wherein the first elastic authentication token is captured during the first time period;
      receive, from a second authentication credential capture device, a second elastic authentication token associated with the user, wherein the second elastic authentication token is captured during a second time period succeeding the first time period;
      receive, a request to execute a user activity at a third time period succeeding the second time period, wherein the user activity requires authorization of the user;
      construct a continuum of elastic authentication credentials, wherein the continuum of elastic authentication credentials comprises the first elastic authentication token captured during the first time period, and the second elastic authentication token captured during the second time period, wherein the first time period and the second time period precede the third time period of receiving the request to execute the user activity;
      authorize the user for the user activity at the third time period based on at least the successful validation of the continuum of elastic authentication credentials captured prior to receiving the request to execute the user activity at the third time period; and
      allow the user to execute the user activity based on at least the successful authorization of the user.

2. The system of claim 1, wherein generating the first elastic authentication credential capture signal comprises:
   generating a credential parameter component associated with the first elastic authentication credential comprising credential parameters associated with each of the one or more elastic authentication tokens; wherein the credential parameters comprises a time period parameter and a credential type parameter;
   generating a source security metadata component configured to be utilized for ascertaining compromise of the first elastic authentication credential capture signal;
   generating a credential key pair comprising a source credential key sub-component and a target credential key sub-component, wherein the source credential key sub-component and the target credential key sub-component are complementary and are structured to be utilized together to validate the one or more elastic authentication tokens; and
   constructing the first elastic authentication credential capture signal comprising the credential parameter component;
   wherein transmitting the first elastic authentication credential capture signal to the first authentication credential capture device comprises transmitting (i) the first elastic authentication credential capture signal and (ii) the target credential key sub-component.

3. The system of claim 2, wherein the source credential key sub-component and the source security metadata component are not transmitted to the first authentication credential capture device.

4. The system of claim 2, wherein receiving the first elastic authentication token from the first authentication credential capture device comprises:
    receiving the first elastic authentication token comprising:
        a captured credential component comprising authentication credential data associated with the user, captured during the first time period based on the credential parameters of the first elastic authentication credential capture signal; and
        a target security metadata component configured to be utilized for ascertaining compromise of the first elastic authentication token; and
    receiving the target credential key sub-component.

5. The system of claim 4, wherein constructing the continuum of elastic authentication credentials comprises performing a first level of validation of the first elastic authentication token comprising:
    retrieving the source credential key sub-component associated with the generating the first elastic authentication credential capture signal of the first elastic authentication token; and
    identifying a successful first level of validation based on determining that the source credential key sub-component complements the target credential key sub-component received from the first authentication credential capture device.

6. The system of claim 5, wherein constructing the continuum of elastic authentication credentials comprises, in response to the successful first level of validation, performing a second level of validation of the first elastic authentication token comprising:
    retrieving the source security metadata component associated with generating the first elastic authentication credential capture signal of the first elastic authentication token; and
    identifying a successful second level of validation based on determining that the source security metadata component matches the target security metadata component received from the first authentication credential capture device.

7. The system of claim 4, wherein authorizing the user for the user activity at the third time period, comprises performing a third level of validation of the first elastic authentication token comprising:
    validating the captured credential component comprising the authentication credential data associated with the user, captured during the first time period.

8. The system of claim 4, wherein constructing the continuum of elastic authentication credentials comprises, performing lateral validation of the first elastic authentication token and the second elastic authentication token comprising:
    identifying a successful lateral of validation of the first elastic authentication token and the second elastic authentication token based on determining that (i) the source credential key sub-component of the first elastic authentication token matches the corresponding source credential key sub-component of the second elastic authentication token, and/or (ii) the target credential key sub-component of the first elastic authentication token matches the corresponding target credential key sub-component of the second elastic authentication token.

9. The system of claim 2, wherein generating the first elastic authentication credential capture signal comprises encoding the first elastic authentication credential capture signal, wherein the source security metadata component comprises a cyclic redundancy check (CRC) code and/or a checksum associated with the first elastic authentication credential capture signal.

10. The system of claim 2, wherein generating the first elastic authentication credential capture signal comprises encoding the first elastic authentication credential capture signal, wherein the first elastic authentication credential capture signal comprises:
    a trigger code that is configured to cause the first authentication credential capture device to arbitrarily modify the credential type parameters and/or the time period parameters for collection of the one or more elastic authentication tokens at predetermined intervals of time.

11. The system of claim 1, wherein transmitting via the operative communication link, the first elastic authentication credential capture signal further comprises:
    transmitting, via a first operative communication channel, a first portion of the first elastic authentication credential capture signal to the first authentication credential capture device; and
    transmitting, via a second operative communication channel, a second portion of the first elastic authentication credential capture signal to the first authentication credential capture device.

12. The system of claim 1, wherein the module further comprises instructions that cause the at least one processing device to:
    generate a second elastic authentication credential capture signal configured to cause the second authentication credential capture device to initiate collection of the second elastic authentication token at the second time period;
    transmit, the second elastic authentication credentials capture signal to the second authentication credential capture device, wherein the first elastic authentication credential capture signal is structured to cause the second authentication credential capture device to initiate capture of the second elastic authentication token at the second time period; and
    receive, from the second authentication credential capture device, the second elastic authentication token associated with the user, wherein the second elastic authentication token is captured by the second authentication credential capture device during the second time period succeeding the first time period.

13. The system of claim 1, wherein the first authentication credential capture device is same as the second authentication credential capture device, wherein the first elastic authentication credential capture signal is configured to cause the first authentication credential capture device to initiate capture of the second elastic authentication token of the one or more elastic authentication tokens at the second time period succeeding the first time period.

14. The system of claim 1, wherein the first elastic authentication credential capture signal is configured to capture the first elastic authentication token at the first time period such that (i) the first time period occurs at an unscheduled arbitrary time period, or (ii) the first time period is a predetermined time period.

15. The system of claim 1, wherein the second elastic authentication token is captured during a second time period (i) occurring after a time interval of an arbitrary length following the first time period, or (ii) occurring after a time interval of a predetermined length following the first time period.

16. The system of claim 1, wherein the first elastic authentication token captured during the first time period is received from the first authentication credential capture device after receiving the request to execute the user activity at the third time period, wherein receiving the first authentication token comprises:
    transmitting a token request signal, via the operative communication link, to the first authentication credential capture device in response to receiving the request to execute the user activity, wherein the token request signal is configured to cause the first authentication credential capture device to transmit the first elastic authentication token captured during the first time period.

17. The system of claim 1, wherein the module further comprises instructions that cause the at least one processing device to:
    construct an auxiliary continuum of elastic authentication credentials associated with an auxiliary user, wherein the auxiliary continuum of elastic authentication credentials comprises one or more elastic authentication tokens associated with the auxiliary user; and
    authorize the user for the user activity based on at least the successful validation of the continuum of elastic authentication credentials associated with the user, in combination with the auxiliary continuum of elastic authentication credentials associated with the auxiliary user.

18. The system of claim 1, wherein authorizing the user for the user activity at the third time period comprises:
    determining whether the continuum of elastic authentication credentials matches a required quorum of elastic authentication tokens for the user activity;
    based on determining that the continuum of elastic authentication credentials does not match the required quorum of elastic authentication tokens for the user activity, identifying a third elastic authentication token associated with the user captured prior to the third time period of receiving the request to execute the user activity such that the third elastic authentication token together with the continuum of elastic authentication credentials matches the required quorum of elastic authentication tokens for the user activity; and
    augmenting the continuum of elastic authentication credentials with the third elastic authentication token.

19. A computer program product for providing elastic authentication based on a continuum of elastic authentication credentials, whereby the computer program product is structured to provide a secure platform for authorization based on validation of the continuum of elastic authentication credentials comprising cumulative tiered elastic authentication tokens captured during an extended time period prior to initiation of a user activity, comprising a non-transitory computer-readable storage medium having computer-executable instructions to:
    generate a first elastic authentication credential capture signal structured to cause a first authentication credential capture device to initiate collection of one or more elastic authentication tokens;
    establish an operative communication link with the first authentication credential capture device associated with a user;
    transmit, via the operative communication link, the first elastic authentication credential capture signal to the first authentication credential capture device, wherein the first elastic authentication credential capture signal is structured to cause the first authentication credential capture device to initiate capture of a first elastic authentication token of the one or more elastic authentication tokens at a first time period;
    receive, from the first authentication credential capture device, the first elastic authentication token associated with the user, wherein the first elastic authentication token is captured during the first time period;
    receive, from a second authentication credential capture device, a second elastic authentication token associated with the user, wherein the second elastic authentication token is captured during a second time period succeeding the first time period;
    receive, a request to execute a user activity at a third time period succeeding the second time period, wherein the user activity requires authorization of the user;
    construct a continuum of elastic authentication credentials, wherein the continuum of elastic authentication credentials comprises the first elastic authentication token captured during the first time period, and the second elastic authentication token captured during the second time period, wherein the first time period and the second time period precede the third time period of receiving the request to execute the user activity;
    authorize the user for the user activity at the third time period based on at least the successful validation of the continuum of elastic authentication credentials captured prior to receiving the request to execute the user activity at the third time period; and
    allow the user to execute the user activity based on at least the successful authorization of the user.

20. The computer program product of claim 19, wherein generating the first elastic authentication credential capture signal comprises:
    generating a credential parameter component associated with the first elastic authentication credential comprising credential parameters associated with each of the one or more elastic authentication tokens; wherein the credential parameters comprises a time period parameter and a credential type parameter;
    generating a source security metadata component configured to be utilized for ascertaining compromise of the first elastic authentication credential capture signal;
    generating a credential key pair comprising a source credential key sub-component and a target credential key sub-component, wherein the source credential key sub-component and the target credential key sub-component are complementary and are structured to be utilized together to validate the one or more elastic authentication tokens; and
    constructing the first elastic authentication credential capture signal comprising the credential parameter component;
    wherein transmitting the first elastic authentication credential capture signal to the first authentication credential capture device comprises transmitting (i) the first elastic authentication credential capture signal and (ii) the target credential key sub-component.

21. The computer program product of claim 20, wherein receiving the first elastic authentication token from the first authentication credential capture device comprises:
    receiving the first elastic authentication token comprising:
        a captured credential component comprising authentication credential data associated with the user, captured during the first time period based on the credential parameters of the first elastic authentication credential capture signal; and a target security metadata component configured to be utilized for ascertaining compromise of the first elastic authentication token; and receiving the target credential key sub-component.

22. A computerized method for providing elastic authentication based on a continuum of elastic authentication credentials, wherein the computerized method provides a secure platform for authorization based on validation of the continuum of elastic authentication credentials comprising cumulative tiered elastic authentication tokens captured during an extended time period prior to initiation of a user activity, the computerized method comprising:

generating a first elastic authentication credential capture signal structured to cause a first authentication credential capture device to initiate collection of one or more elastic authentication tokens;

establishing an operative communication link with the first authentication credential capture device associated with a user;

transmitting, via the operative communication link, the first elastic authentication credential capture signal to the first authentication credential capture device, wherein the first elastic authentication credential capture signal is structured to cause the first authentication credential capture device to initiate capture of a first elastic authentication token of the one or more elastic authentication tokens at a first time period;

receiving, from the first authentication credential capture device, the first elastic authentication token associated with the user, wherein the first elastic authentication token is captured during the first time period;

receiving, from a second authentication credential capture device, a second elastic authentication token associated with the user, wherein the second elastic authentication token is captured during a second time period succeeding the first time period;

receiving, a request to execute a user activity at a third time period succeeding the second time period, wherein the user activity requires authorization of the user;

constructing a continuum of elastic authentication credentials, wherein the continuum of elastic authentication credentials comprises the first elastic authentication token captured during the first time period, and the second elastic authentication token captured during the second time period, wherein the first time period and the second time period precede the third time period of receiving the request to execute the user activity;

authorizing the user for the user activity at the third time period based on at least the successful validation of the continuum of elastic authentication credentials captured prior to receiving the request to execute the user activity at the third time period; and allowing the user to execute the user activity based on at least the successful authorization of the user.

23. The computerized method of claim 22, wherein generating the first elastic authentication credential capture signal comprises:

generating a credential parameter component associated with the first elastic authentication credential comprising credential parameters associated with each of the one or more elastic authentication tokens; wherein the credential parameters comprises a time period parameter and a credential type parameter;

generating a source security metadata component configured to be utilized for ascertaining compromise of the first elastic authentication credential capture signal;

generating a credential key pair comprising a source credential key sub-component and a target credential key sub-component, wherein the source credential key sub-component and the target credential key sub-component are complementary and are structured to be utilized together to validate the one or more elastic authentication tokens; and constructing the first elastic authentication credential capture signal comprising the credential parameter component;

wherein transmitting the first elastic authentication credential capture signal to the first authentication credential capture device comprises transmitting (i) the first elastic authentication credential capture signal and (ii) the target credential key sub-component.

24. The computerized method of claim 23, wherein receiving the first elastic authentication token from the first authentication credential capture device comprises:

receiving the first elastic authentication token comprising:
a captured credential component comprising authentication credential data associated with the user, captured during the first time period based on the credential parameters of the first elastic authentication credential capture signal; and
a target security metadata component configured to be utilized for ascertaining compromise of the first elastic authentication token; and receiving the target credential key sub-component.

* * * * *